June 18, 1929.  W. KLEHR  1,718,155
ELECTRIC LIGHT FIXTURE
Filed May 15, 1928
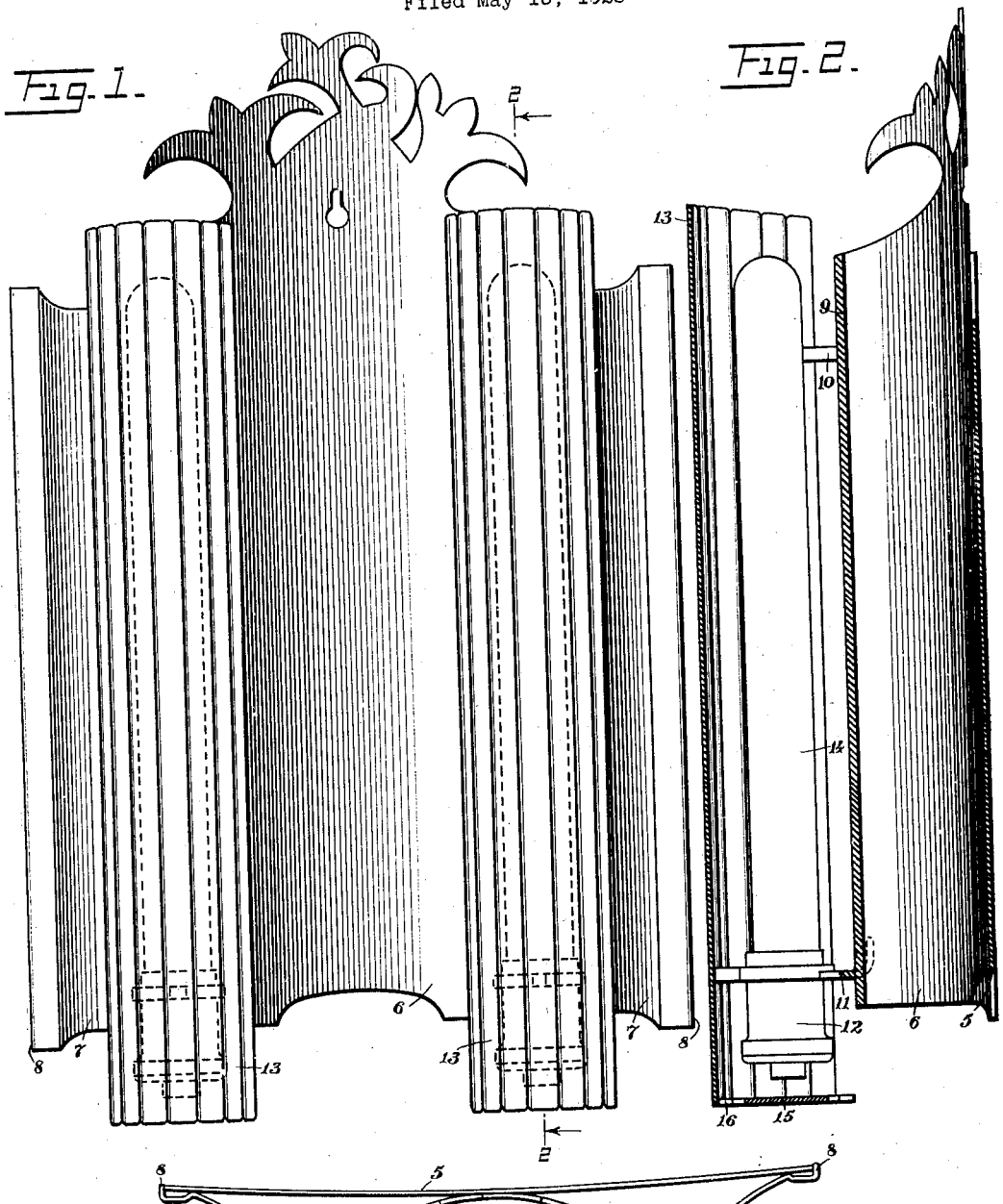
INVENTOR
William Klehr
BY
ATTORNEY Patented June 18, 1929.

1,718,155

UNITED STATES PATENT OFFICE.

WILLIAM KLEHR, OF FOREST HILLS, NEW YORK, ASSIGNOR TO EDW. F. CALDWELL & COMPANY, INC., OF NEW YORK, N. Y., A CORPORATION OF NEW YORK.

ELECTRIC-LIGHT FIXTURE.

Application filed May 15, 1928. Serial No. 277,889.

My invention has for its object to provide an electric light fixture having a front reflector to hide lamps disposed behind and to throw rays of light on rear reflectors which are disposed to throw the light rays laterally and indirectly forwardly.

Another object of the invention is to curve the rear reflector laterally and rearwardly from forward portions and to mount the lamps and the front reflector on the said forward portions of the rear reflector.

Additional objects of the invention will appear in the following specification in which the preferred form of my invention is described.

In the drawings similar reference characters refer to similar parts in all the views, in which:

Figure 1 is a front elevation showing my electric light fixture;

Figure 2 is a sectional view on line 2—2 of Figure 1; and

Figure 3 is a plan view of Figure 1.

My electric light fixture provides a novel means for indirect lighting which serves to diffuse the light rays and to throw the light rays indirectly forward, the construction being such as to lend itself to artistic treatment.

By referring to the drawings it will be seen that a base member 5, which serves as a support for the electric light fixture, has a central rear reflector 6 and lateral rear reflectors 7, the outer sides of the lateral rear reflectors 7 being secured to the base member 5 at 8. The central rear reflector 6 curves from its central portion forwardly and laterally, as is best shown in Figure 3 of the drawings, and the lateral rear reflectors 7 are also curved and converge outwardly, the forward portions of the central rear reflector 6 and the lateral rear reflectors 7 being secured together at 9.

Extending outwardly at 9 from the upper portions of the central and lateral rear reflectors 6 and 7 there are arms 10, and extending outwardly from the lower portions of the central and lateral rear reflectors 6 and 7 there are brackets 11, the brackets 11 carrying a lamp socket 12 and the arms 10 and the brackets 11 serving to support the front reflectors 13. The said front reflectors are curved from their forward portions laterally and rearwardly and serve to throw the light from the lamps 14 in the lamp sockets 12 against the rear reflectors 6 and 7 so that the light will be diffused and directed laterally and forwardly.

At the bottom of the front reflectors 13 there are preferably discs 15 which are supported by lugs 16 secured to the front reflectors 13, the discs serving to direct upwardly the light rays from the lamps 14.

It will be seen that the rays of light from the lamps 14 will strike the rear reflectors 6 and 7 and the central rear reflector 6 will serve to throw the light forwardly while the lateral rear reflectors 7 will serve to throw the light laterally and forwardly.

I claim:

In an electric light fixture, a vertically disposed rear reflector, the sides of which extend laterally and rearwardly from both sides of its forward portion, arms extending laterally from the forward portion of the rear reflector, a vertically extending front reflector disposed in front of the said forward portion of the rear reflector, the front reflector in cross section being substantially circular and open at the rear, the sides of the front reflector being secured to the arms, a lamp disposed substantially at the center of the circular front reflector and extending longitudinally thereof, the sides of the front reflector extending rearwardly beyond the rear of the lamp, and a disc at the bottom of the front reflector below the lamp to reflect the light rays from the lamp upwardly, the circular front reflector reflecting the light rays rearwardly.

Signed at New York in the county of New York, and State of New York this 7th day of May, A. D. 1928.

WILLIAM KLEHR.